United States Patent Office 3,449,346
Patented June 10, 1969

3,449,346
BENZENESULFONYL UREAS
Walter Aumüller, Kelkheim, Taunus, Rudi Weyer and Helmut Weber, Frankfurt am Main, Karl Muth, Kelkheim, Taunus, and Wilhelm Peschke, Mannheim, Germany, assignors to Farbwerke Hoechst Aktiengesellschaft vormals Meister Lucius & Bruning, Frankfurt am Main, Germany, a corporation of Germany
No Drawing. Filed Oct. 26, 1965, Ser. No. 505,232
Claims priority, application Germany, Oct. 30, 1964, F 44,343
Int. Cl. C07d 27/52; C07c 143/84; A61k 27/00
U.S. Cl. 260—281
14 Claims

ABSTRACT OF THE DISCLOSURE

Benzenesulfonyl-urea compounds having hypoglycemic activity and the formula

X—Y—Ph—SO$_2$—NH—CO—NH—R wherein X is phthalimido, tetrahydro-phthalimido or hexahydrophthalimido that is unsubstituted or is mono- or disubstituted by lower alkyl, lower alkoxy or chlorine, or is tetrahydroendomethylene-phthalimido, hexahydro-endomethylene - phthalimido, tetrahydro - endoethylene - pthalimido, hexahydro-endoethylene-phthalimido or naphthalimido; Y is an alkylene of 1 to 4 carbon atoms; Ph is unsubstituted phenylene or phenylene substituted by chlorine, lower alkyl or lower alkoxy; and R is:

(a) alkyl of 2 to 8 carbon atoms,
(b) phenyl-lower alkyl,
(c) lower cyclohexyl-alkyl, cycloheptylmethyl, cycloheptylethyl or cyclooctyl-methyl,
(d) endoalkylene-cyclohexyl, endoalklene-cyclohexenyl, endoalkylene-cyclohexylmethyl or endoalkylene-cyclohexenylmethyl with 1-2 endoalkylene carbor atoms,
(e) lower alkyl-cyclohexyl,
(f) cycloalkyl of 5 to 8 carbon atoms, or
(g) cyclohexenyl or cyclohexenyl-methyl; and physiologically tolerable salts thereof.

The present invention provides benzenesulfonyl-ureas corresponding to the general Formula I X—Y—phenylene—SO$_2$—NH—CO—NH—R  (I)

as well as a process for preparing same. These compounds as substance or in the form of their salts show hypoglycemic properties and are distinguished by a strong and long lasting lowering of the blood sugar level.

In the Formula I

X represents a phthalimide radical which, is desired, may totally or partially be hydrogenated and mono- or disubstituted, if desired, by low-molecular alkyl, alkoxy or halogen, or represents a tetrahydro-endomethylene-phthalimide radical, a hexa-hydro-endomethylene-phthalimide radical, a tetrahydro-endoethylene-phthalimide radical or a hexahydro-endoethylene-phthalimide radical, a naphthalimide radical, a naphthalene-1,2-dicarbonimide radical or a naphthalene-2,3-dicarbonimide radical,
Y represents a hydrocarbon chain which may be ramified and contains 1–4 carbon atoms, preferably ethylene,
phenylene represents a phenylene radical which may be unsubstituted or one or several times substituted by halogen, lower alkyl or lower alkoxy (1–4 carbon atoms). It may contain the remaining parts of the molecule in ortho-, para- or meta-position to each other, the para-position being preferred;

R stands for:
(a) an alkyl-, alkenyl- of mercapto-alkyl group with 2–8 carbon atoms,
(b) an alkoxyalkyl- or an alkylmercaptoalkyl group having 4–8 carbon atoms of which at least two belong to the alkylene part of the alkoxyalkyl- or the alkylmercaptoalkyl group,
(c) lower phenylalkyl, phenylcyclopropyl,
(d) lower cyclohexyl-alkyl, cycloheptylmethyl, cycloheptyl-ethyl or cyclooctyl-methyl,
(e) endoalkylene-cyclohexyl, endoalkylene-cyclohexenyl, endoalkylene-cyclohexylmethyl, endoalkylene-cyclohexenylmethyl with 1–2 endoalkylene carbon atoms,
(f) lower alkylcyclohexyl, lower alkoxycyclohexyl,
(g) cycloalkytl with 5 to 8 carbon atoms,
(h) cyclohexenyl, cyclohexenyl-methyl,
(i) a heterocyclic ring with 4 to 5 carbon atoms and an oxygen atom or a sulfur atom as well as up to two ethylenic double linkages or
(k) a heterocyclic ring linked to the nitrogen atom via a methylene radical and containing 4–5 carbon atoms and an oxygen atom or a sulfur atom as well as up to two ethylenic double linkages.

The process of the present invention consists in (a) reacting benzenesulfonamides of the formula X—Y—phenylene—SO$_2$—NH$_2$ favorably in the form of their salts, with R-substituted isocyanates, carbamic acid esters, thiocarbamic acid esters, carbamic acid halides or ureas, (b) reacting amines of the formula R—NH$_2$ or their salts with X-Y-substituted benzenesulfonyl-isocyanates, benzenesulfonyl-carbamic acid esters, benzenesulfonyl-thiocarbamic acid esters, benzenesulfonyl-carbamic acid halides or benzenesulfonyl-ureas, (c) reacting benzenesulfochlorides of the formula X—Y—phenylene—SO$_2$—Cl with R-substituted ureas, isourea ethers, isothio-urea ethers or parabanic acids and hydrolyzing the benzenesulfonyl - isourea - ethers, benzenesulfonyl - isothiourea-ethers or benzenesulfonyl-parabanic acids obtained by this method or by another process, (d) replacing in benzenesulfonyl-thioureas of the formula X—Y—phenylene—SO$_2$—NH—CS—NH—R the sulfur atom by an oxygen atom or (e) oxidizing corresponding benzenesulfenyl-ureas or benzenesulfinyl-ureas and converting benzenesulfonyl-ureas which may be formed in the above-mentioned reactions by ring-cleavage or in any other way and which correspond to the formula Z—Y—phenylene—SO$_2$—NH—CO—NH—R in which Z stands for a phthalic acid-monoamide group which may be totally or partially hydrogenated or mono- or disubstituted by lower alkyl, alkoxy or halogen, a tetrahydro- or hexahydro-endomethylene- or a tetrahydro- or hexahydro-endoethylene-phthalic acid monoamide group, a naphthalic acid monoamide group, or a naphthalene-1,2-dicarboxylic acid-monoamide group or a naphthalene-2,3-dicarboxylic acid-monoamide group by cyclization into the corresponding phthalimide compound and, if desired, treating the compounds obtained with alkaline agents in order to obtain the salts.

The above-mentioned benzenesulfonyl-carbamic acid esters or the benzenesulfonyl-thiocarbamic acid esters may contain in the alcohol component a lower alkyl group or a phenyl group. The same applies to the R-substituted carbamic acid esters or the corresponding monothiocarbamic acid esters.

As carbamic acid halides the chlorides are advantageously used.

The benzenesulfonyl-ureas used as starting materials may be unsubstituted at the side of the urea molecule opposite to the sulfonyl group or may, preferably, be mono- or disubstituted by lower alkyl groups or aryl groups. The aryl groups may be linked with one another by a chemical bond or by means of a bridge member such, for example, as —CH$_2$—, —NH—, —O— or —S—. Instead of benzenesulfonyl-ureas substituted in this manner there can also be used corresponding N-benzenesulfonyl-N'-acyl-ureas which, in addition, may be alkylated or arylated at the N'-nitrogen atom and also bis-(benzenesulfonyl)-ureas. It is, for example, possible to treat these bis - (benzenesulfonyl) - ureas or N - benzene - sulfonyl-N'-acyl-ureas with amines of the formula RNH$_2$.

The salts obtained are heated to elevated temperatures, particularly to temperatures superior to 100° C.

It is likewise possible to start from areas of the formula R—NH—CO—NH$_2$ or from acylated ureas of the formula R—NH—CO—NH—acyl, in which acyl represents an aliphatic or aromtaic acid radical preferably of low molecular weight, or the nitro-group, or from phenyl-ureas of the formula R—NH—CO—NH—C$_6$H$_5$ or from diphenyl-ureas of the formula R—NH—CO—N(C$_6$H$_5$)$_2$, in which case the phenyl radicals may be substituted and may be linked with one another directly or by means of a bridge member such as —CH$_2$—, —NH—, —O— or —S—, or from N,N-disubstituted ureas of the formula R—NH—CO—NH—R and to react them with benzenesulfonamides of the formula Z—Y—phenylene—SO$_2$—NH$_2$ In the correspondingly substituted benzenesulfonyl-thioureas the sulfur atom can be replaced by an oxygen atom for instance with the aid of oxides or salts of heavy metals or likewise by applying oxidizing agents such as hydrogen peroxide, sodium peroxide or nitrous acid. The thioureas can likewise desulfurized by treating them with phosgene or phosphorus penta-chloride. Chloroformic acid amidines or chloroformic acid carbo-diimides obtained as intermediate products can be converted into the benzenesulfonyl-ureas by a suitable treatment such as, for instance, hydrolysis or addition of water.

As regards the reaction conditions, the methods of carrying out the aforesaid processes (a) to (e) may, in general, vary within wide limits and can be adapted to each individual case. For example, the reactions can be carried out with the use of solvents. As reaction temperatures, temperatures of about 50 to 100° C. are above all applied.

As starting substances for the reactions according to methods (a) to (e) there are used, preferably, R-substituted isocyanates, carbamic acid esters, thiocarbamic acid esters, carbamic acid halides, ureas, thioureas, parabanic acids, isourea ethers, isothiourea ethers or amines containing as R a cycloaliphatic hydrocarbon radical which may be substituted by alkyl or alkoxy or linked to the nitrogen atom by means of alkylene. As radicals of said type there are mentioned for instance: cyclopentyl, cyclohexyl, cycloheptyl, cyclooctyl, methylcyclohexyl, ethylcyclohexyl, propylcyclohexyl and isopropylcyclohexyl or the corresponding alkoxycyclohexyls, the alkyl- or alkoxy groups preferably being in 4-position, in transposition, cyclohexylmethyl, cyclohexylethyl, cyclohexylpropyl, endomethylene-cyclohexyl, endomethylene-cyclohexenyl, endomethylene-cyclohexyl-methyl, endomethylene-cyclohexenyl-methyl.

As starting substances for the reactions according to (a–e) there enter likewise into consideration the following benzenesulfonamides or benzenesulfonyl-iso-cyanates, benzenesulfonyl-carbamic acid esters, benzenesulfonyl-carbamic acid halides, benzenesulfonyl-ureas or benzenesulfonyl-chlorides derived therefrom, only the most important compounds being mentioned:

(α) phthalimidoalkyl-benznesulfonamides, such, for instance, as

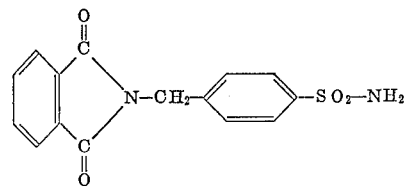

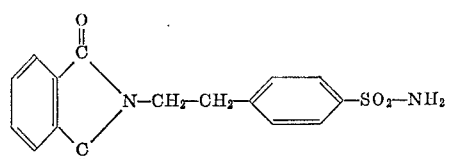

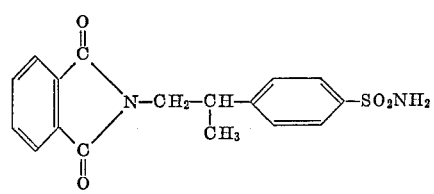

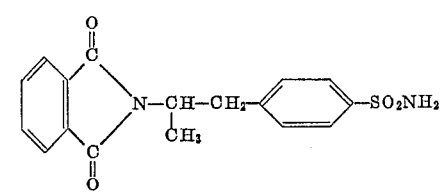

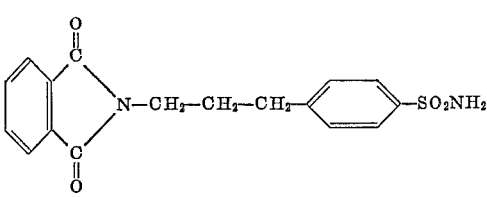

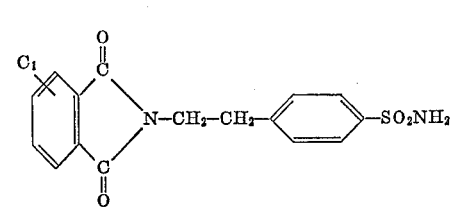

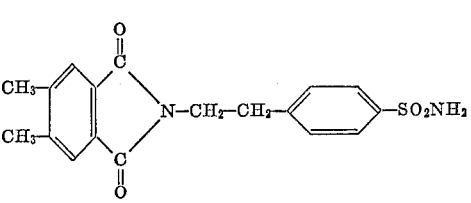

(β) corresponding tetrahydrophthalimido-alkyl-benzene-sulfonamides and hexahydrophthalimido-alkyl-benzene-sulfonamides, such for example, as:

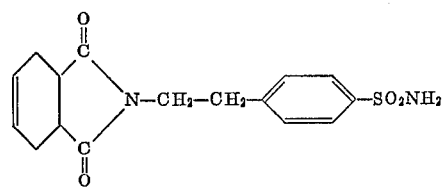

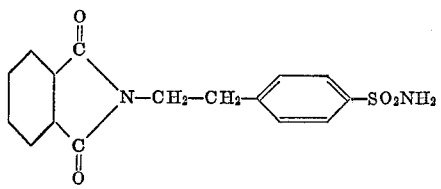

(γ) Endomethylene-tetrahydro-phthalimido-alkyl-benzene-sulfonamides and endomethylene-hexahydrophthalimido-alkyl-benzenesulfonamides such, for example, as:

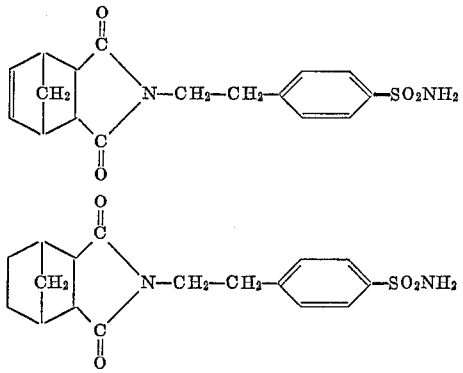

(δ) Naphthalimidoalkyl-benzenesulfonamides, such, for example, as:

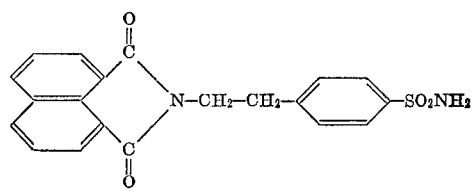

(ε) Naphthalene-dicarbonamidoalkyl-benzene-sulfonamide, such for example, as:

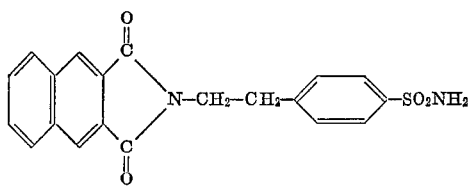

furthermore corresponding compounds whose dicarbonimido-alkyl-groups in the phenylene-radical are in meta- or ortho-position to the sulfamide group; the phenylene group may likewise be substituted in the above-mentioned way.

The benzenesulfonamides mentioned as starting substances for the method (a) are suitably prepared by reacting aminoalkyl-benzenes with the anhydrides of the aromatic or aliphatic dicarboxylic acids with heating, chlorosulfonating and converting the sulfochlorides into the amides by means of concentrated aqueous ammonia.

As starting substances for the above-mentioned cyclization the following benzenesulfonyl-ureas are used:

(α) N-[2-carboxy-benzamidoalkyl - benzenesulfonyl]-ureas, such as:

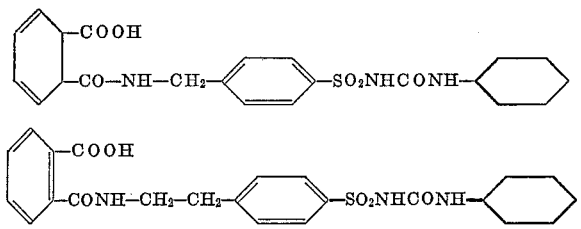

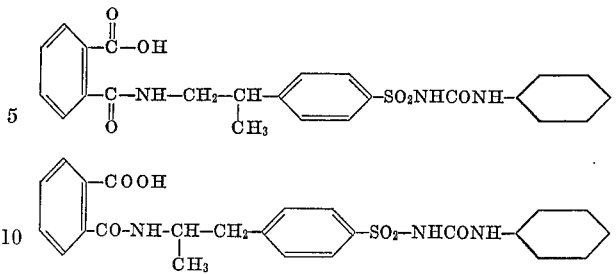

as well as corresponding N'-methylcyclohexyl-ureas.

(β) Tetrahydro-2-carboxybenzamidoalkyl - benzenesulfonyl-ureas and hexahydro-2-carboxybenzamidoalkyl-benzenesulfonyl-ureas such as:

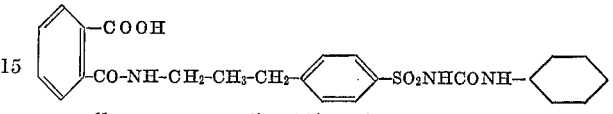

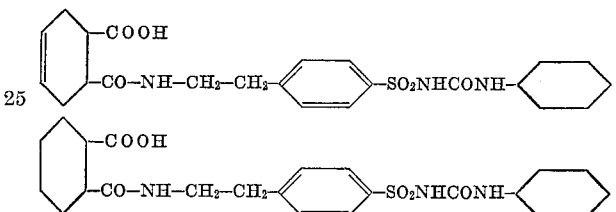

(γ) Endomethylenetetrahydro - 2 - carboxy-cyclohexane-carbonamidoalkyl-benzene sulfonyl-ureas or endomethylenehexahydro-2-carboxy - cyclohexane - carbonamido-alkyl-benzenesulfonyl ureas such, for example, as:

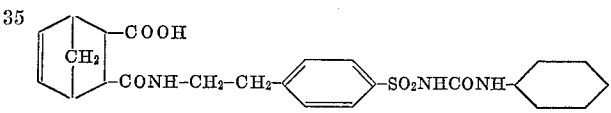

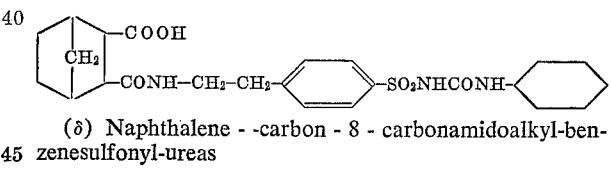

(δ) Naphthalene - -carbon - 8 - carbonamidoalkyl-benzenesulfonyl-ureas

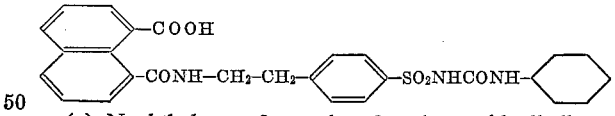

(ε) Naphthalene - 2 - carbon-3-carbonamidoalkylbenzenesulfonyl-ureas such as:

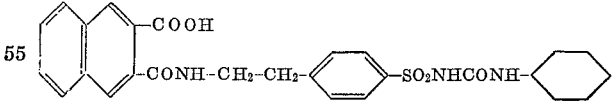

Instead of the dicarboxylic acid-monoamide derivatives there can likewise be used corresponding functional derivatives, such, for example, as the monocarboxylic esters, monocarbonamides.

The conversion of the above-mentioned benzenesulfonyl-ureas containing a carboxy group adjacent to carbonamido-alkyl grouping into the products according to the invention is carried out according to the methods usually applied for a phthalimide cyclization, for instance by heating the benzenesulfonyl-ureas used as starting substances to a temperature closely below the melting point.

The hypoglycemic action of the products of the invention could be determined in rabbits by feeding to them the products in doses of at most 50 milligrams/kilogram and determining the blood sugar value according to the known method of Hagedorn-Jensen or by means of an autoanaylser over a prolonged period. Thus, it was detected that the N-[4-(β-phthalimido-ethyl)-benzenesulfonyl]-N'-cyclohexyl-urea when given in a dose of 50 mg./kg. provoked after 3 hours a lowering of the blood sugar level by 32%, when given in a dose of 10 milligrams/kilogram by 19% and with a dose of 2 milligrams/kilogram still by 10%.

The corresponding N-14-(β-phthalimido-α-methyl-ethyl) benzenesulfonyl]-N'-4-methylcyclohexyl-urea after 3 hours upon application in a dose of 10 milligrams/kilogram lowered the blood sugar level by 35%, in a dose of 2 milligrams/kilogram by 17%.

The N-[4-(β-tetrahydrophthalimido-ethyl)-benzenesulfonyl]-N-4-methylcyclohexyl-urea applied in a dose of 10 milliagrams/kilogram provoked a lowering by 44%, in a dose at 2 milligrams/kilogram by 45%, in a dose of 0.4% milligram/kilogram by 37%.

The values for the corresponding N-[4-(β-hexahydrophthalimido-ethyl)-benzenesulfonyl] - N' - 4-methyl-cyclohexyl-ureau amount to 31, 19 and 14% respectively.

In comparison therewith the known N-(4-methylbenzenesulfonyl)-N''-butyl-urea given in a dose inferior to 25 milligrams/kilogram to the rabbit is no more effective.

The products of the present invention are preferably used for the manufacture of orally administerable pharmaceutical preparations showing blood sugar lowering action in the treatment of diabetes mellitus and can be used as such or in the form of their physiologically tolerable salts or in the presence of substances causing the formation of such salts. For the formation of salts there may be used: alkaline agents, for example, alkali metal hydroxides, alkaline earth metal hydroxides, alkali metal carbonates, alkaline earth metal carbonates, alkali metal bicarbonates, alkaline earth metal bicarbonates. The pharmaceutical preparations are preferably in the form of tablets containing, in addition to the compounds of the invention, the usual adjuvants and carriers such as talc, starch, lactose, tragacanth or magnesium stearate.

A preparation containing the above-mentioned benzenesulfonyl-ureas as active substance, for instance, a tablet or a powder, with or without the above-mentioned additions, is favorably brought into a suitable dosage unit form. The dose chosen should comply with the activity of the benzene-sulfonyl-urea used and the desired effect. Favorably, the dosage per unit amounts to about 0.5 to 100 milligrams, preferably to 2 to 10 milligrams, but considerably higher or lower dosage units can likewise be used which, if desired, are divided or multiplied prior to application.

The following examples serve to illustrate the invention but they are not intended to limit it thereto:

Example 1.—N-[4-(phthalimidomethyl)-benzenesulfonyl]-N'-cyclohexyl-urea 15.8 grams of 4-(phthalimidomethyl)-benzene-sulfonamide with 13.8 grams of finely pulverized potassium carbonate in 250 milliliters of acetone are stirred for 1 hour, and heated to the boil, under reflux. 6.3 grams of cyclohexyl-isocyanate are then dropwise added and stirring as well as heating under reflux are continued for 6 hours. The substance is concentrated under reduced pressure and the residue obtained is treated in the cold with dilute hydrochloric acid. The viscous melt obtained crystallizes when treated with isopropanol. It is filtered off with suction and the crude N-[4-(phthalimido-methyl)-benzenesulfonyl]-N'-cyclohexyl - urea is recrystallized from ethanol. The substance melts at 175–177° C.

Example 2.—N-[4-(β-phthalimidoethyl)-benzenesulfonyl]-N'-cyclohexyl-urea (a) 66 grams of 4-(β-phthalimidoethyl)-benzenesulfonamide (melting point 222–225° C.) are reacted as described in Example 1 by using 56 grams of potassium carbonate and 500 milliliters of acetone with 25 grams of cyclohexyl-isocyanate. The crude N-[41(β-phthalimidoethyl)-benzenesulfonyl]-N'-cyclohexyl - urea obtained is recrystallized from methanol. The substance melts at 194–197° C.

(b) The same substance is obtained by heating N-[4-β-(2 - carboxy - benzamido - ethyl) - benzenesulfonyl] - N'-cyclohexyl-urea melting at 161–163° C. with decomposition, for about 3 hours in the high vacuum to about 150–160° C.

By applying the method as described in Example 2(a) there are obtained:

from 4-[β(Δ⁴-tetrahydrophthalimido-ethyl)]-benzenesulfonamide; melting point 183° C., N-[4-(β,Δ⁴-tetrahydrophthalimido-ethyl)-benzenesulfonyl]-N'-cyclohexyl-urea; melting point 156–158° C. (from dilute methanol) and N-[4-(β,Δ⁴-tetrahydronaphthalimido-ethyl)-benzenesulfonyl]-N'-4-(trans)-methylcyclohexyl-urea; melting point 146–149° C. (from methanol)

from 4-(β-hexahydrophthalimido-ethyl-)-benzenesulfonamide; melting point 168–170° C.

N-[4-(β-hexahydrophthalimido-ethyl)-benzenesulfonyl]-N'-butyl-urea; melting point 80–82° C. (from methanol), from the 4-[β-(3,6-methylene-Δ⁴-tetrahydrophthalimido)-ethyl]-benzenesulfonamide, (melting point 206–208° C.):

N-[4-(β-<3,6-methylene-Δ⁴-tetrahydro-phthalimido>-ethyl)-benzenesulfonyl]-N'-cyclohexyl-urea, melting point 200–202° C. ,from methanol);

N-[4-(β-<3,6-methylene-Δ⁴-tetrahydro-phthalimido>-ethyl)-benzenesulfonyl]-N'-(4-methyl-cyclohexyl)-urea, melting point 176–178° C. (from methanol);

N-[4-(β-<3,6-methylene-Δ⁴-tetrahydro-phthalimido>-ethyl)-benzenesulfonyl]-N'-n-hexyl-urea, melting point 122–124° (from methanol);

from the 4-[β-(3-methylene-hexahydro-phthalimido>-ethyl)-benzene-sulfonamide (melting point 210–212° C.):

N-[4-(β-<3,6-methylene-hexahydro-phthalimido>-ethyl)-benzenesulfonyl]-N'-butyl-urea, melting point 138–140° C. (from ethyl-acetate/petroleum ether);

N-[4-(β-<3,6-methylene-hexahydro-phthalimido>-ethyl)-benzenesulfonyl]-N'-cyclohexyl-urea, melting point 184–186° C. (from aqueous methanol);

N-[4-(β-<3,6-methylene-hexahydro-phthalimido>-ethyl)-benzenesulfonyl]-N'-(4-methyl-cyclohexyl)-urea, melting point 175–178° C. (from aqueous methanol).

N-[4-(β-hexahydrophthalimido-ethyl)-benzenesulfonyl]-N'-cyclohexyl-urea, melting point 154–156° C. (from methanol) and N-[4-(β-hexahydrophthalimido-ethyl)-benzenesulfonyl]-N'-4-methylcyclohexyl-urea, melting point 108–110° C. (from methanol).

From 4-[β-(3,6-methylene - Δ⁴ - tetrahydrophthalimido)-ethyl]-benzene-sulfonamide, melting point 206–208° C. and cyclohexyl-isocyanate:

N-[4-(β-<3,6-methylene-Δ⁴-tetrahydro-phthalimido>-ethyl)-benzenesulfonyl]-N'-cyclohexyl-urea, melting point 200–202° C. (from methanol), and with the use of 4-methyl-cyclohexyl-isocyanate N-[4-(β-<3,6-methylene-Δ⁴-tetrahydro-phthalimido>-ethyl)-benzenesulfonyl]-N'-(4-methyl-cyclohexyl)-urea, melting point 176–178° C. (from methanol), and with the use of n-hexyl-isocyanate N-[4-(β-<3,6-methylene-Δ⁴-tetrahydro-phthalimido>-ethyl)-benzenesulfonyl]-N'-n-hexyl-urea, melting point 122–124° C.; by reaction of n-butyl- or cyclohexyl- or 4-methylcyclohexyl-isocyanate with 4-[β-(3-methylene-hexahydro-1-phthalimido)-ethyl]-benzenesulfonamide, melting point 210–212° C.

there are obtained:

N-[4-(β-<3,6-methylene-hexahydro-phthalimido>-ethyl)-benzenesulfonyl]-N'-butyl-urea, melting point 138–140° C. (ethyl acetate/petroleum ether), or N-[4-(β-<3,6-methylene-hexahydro-phthalimido>-ethyl)-benzenesulfonyl[-N'-cyclohexyl-urea, melting point 184–186° C. (from aqueous methanol), or N-[4-(β-<3,6-methylene-hexahydro-phthalimido>-ethyl)-benzenesulfonyl]-N'-(4-methyl-cyclohexyl)-urea, melting point 175–178° C. (from aqueous methanol).

Example 3.—N-[4-(β-phthalimido-α-methyl-ethyl)-benzene-sulfonyl]-N'-cyclohexyl-urea (a) 17.2 grams of 4-[β-phthalimido-α-methyl-ethyl)]-benzene-sulfonamide (melting point 166–170° C.) are dissolved in 500 milliliters of acetone. 13.8 grams of dry, finely pulverized potassium carbonate are added and the whole is heated to the boil under reflux for 1 hour, while simultaneously stirring. After dropwise addition of 6.3 grams of cyclohexyl-isocyanate stirring of the reaction mixture is continued for 7 hours at 56° C. The acetone is distilled off and dilute hydrochloric acid is added to the residue. The crude N-[4-(β-phthalimido-α-methyl-ethyl)-benzenesulfonyl]-N'-cyclohexyl-urea after recrystallization from methanol melts at 175–177° C.

(b) The same substance is obtained by heating N-[4-(β-2 - carboxy-benzamido-α-methyl-ethyl) - benzenesulfonyl]-N'-cyclohexyl-urea (melting point 170° C. with decomposition) for 3 hours to 150–160° C. in the high vacuum.

By a method analogous to that described in Example 3(a) there is obtained with the use of 4-methyl-cyclohexyl-isocyanate:
N - [4 - (β - phthalimido-α-methylethyl)-benzenesulfonyl]-N'-(4 - methyl - cyclohexyl)-urea, melting point 208–209° C.;
with the use of n-butyl-isocyanate:
N - [4-(β-phthalimido-α-methylethyl) - benzenesulfonyl]-N'-n-butyl-urea; melting point 163–165° C.

Example 4.—N-[4-(β-chloro-phthalimido-ethyl)-benzenesulfonyl]-N'-cyclohexyl-urea 18.3 grams of 4-(β-4-chloro-phthalimido-ethyl)-benzenesulfonamide (melting point 202–204° C.) are dissolved in 250 milliliters of acetone.

Upon addition of 13.8 grams of potassium carbonate the solution is heated to the boil and stirred for 1 hour; with further heating and stirring 6.3 grams of cyclohexylisocyanate are dropwise added and stirring and heating are continued for 3 hours. The batch is concentrated in the vacuum, dilute hydrochloric acid is added to the residue and the crystals obtained are filtered off with suction. They are dissolved in a high excess of ammonia of 1% strength and the mixture is heated for about 1 hour on the steam bath. After acidification with hydrochloric acid a substance is obtained which melts at 118–119° C. with decomposition. It is heated for 6 hours at 100° C. in the high vacuum. The N-[4-β-chlorophthalimido-ethyl) - benzenesulfonyl]-N'-cyclohexyl-urea melts at 186–188° C.

In an analogous manner there is obtained with the use of 4-methyl-cyclohexylisocyanate:
N - [4 - (β-4-chloro-phthalimido-ethyl)-benzenesulfonyl]-N'-(4-methyl-cyclohexyl)-urea, melting point 179–181° C.
From 4-(β-naphthalimido-ethyl)-benzenesulfonamide, melting point 282–283° C., there is obtained:
N - [4-β-naphthalimidoethyl) - benzenesulfonyl]-N'-4-methylcyclohexyl-urea (trans), melting point 287–289° C. from dilute methanol.
From 4-(δ-naphthalimidopropyl)-benzenesulfonamide, melting point 223–224° C.
N - [4-(δ-naphthalimidopropyl) - benzenesulfonyl]-N'-cyclohexyl-urea, melting point 204–206° C. (from a mixture of dimethyl-formamide and methanol) and
N - [4-(δ-naphthalimidopropyl) - benzenesulfonyl]-N'-4-methylcyclohexyl-urea, melting point 193–195° C. (trans) from a mixture of dimethyl-formamide and methanol,
and from 3-(β-phthalimidoethyl)-2,4,6-trimethyl-benzenesulfonamide, melting point 272–276° C. (from dimethylformamide):
N - [3-(β-phthalimidoethyl) - 2,4,6-trimethyl-benzenesulfonyl]-N'-4-methyl-cyclohexyl-urea (trans form), melting point 263–266° C.
From 4-(β-naphthalimido-ethyl) - benzenesulfonamide (melting point 282–283° C.:)
N - [4-(β-naphthalimido-ethyl) - benzenesulfonyl]-N'-(4-methyl-cyclohexyl-urea, melting point 210–212° C. (from dioxane) and
N - [4-(β-naphthalimido-ethyl) - benzenesulfonyl]-N'-n-hexyl-urea, melting point 198–210° C. (by dissolution in chloroform and precipitation with petroleum ether in the form of a crystallisation) and
N - [4-(β-naphthalimido-ethyl) - benzenesulfonyl]-N'-isobutyl-urea, melting point 200–202° C. (from chloroform/petroleum ether).

Example 5.—N-[4-β-naphthalene-2,3-dicarbonamido-ethyl)-benezenesulfonyl]-N'-n-hexyl-urea 34.8 grams of 4-(β-naphthalene-2,3-dicarbonamido-ethyl)-benzenesulfonamide are suspended in 600 milliliters of dioxane. 27.6 grams of $K_2CO_3$ are added and the whole is heated for 90 minutes to the boil while stirring. After addition of 12.7 grams of normal hexylisocyanate, stirring and heating under reflux arc continued for 5 hours. The mixture is allowed to cool, dilute with water, acidified and shaken through with chloroform. The chloroform-solution is separated off, washed with water and dried with sodium sulfate. After having distilled off the chloroform, the residue obtained is treated with methanol. A crystallization product of N-[4-(β-naphthalene-2,3-dicarbonamido-ethyl) - benzenesulfonyl] - N'-n-hexyl-urea is obtained which is filtered off with the suction and dried. The substance melts at 214–216° C. with decomposition.

By an analogous method there is obtained N-[4-(β-naphthalene - 2,3-dicardbonamido-ethyl) - benzene-sulfonyl]-N'-(4-methyl-cyclohexyl)-urea, melting point 260° C. (decomposition) (by dissolution in chloroform and precipitation with methanol).

We claim:
1. A benzenesulfonyl-urea compound of the formula

wherein X is phthalimido, tetrahydro-phthalimido or hexahydro-phthalimido that is unsubstituted or is mono- or di-substituted by lower alkyl, lower alkoxy or chlorine, or is tetrahydro-endomethylene-phthalimido, hexahydro-endomethylene-phthalimido, tetrahydro-endoethylene-phthalimido, hexahydro-endoethylene-phthalimido or naphthalimido;
Y is an alkylene of 1 to 4 carbon atoms;
Ph is unsubstituted phenylene or phenylene substituted by chlorine, lower alkyl or lower alkoxy; and
R is:
  (a) alkyl of 2 to 8 carbon atoms,
  (b) phenyl-lower alkyl,
  (c) lower cyclohexyl-alkyl, cycloheptylemthyl, cycloheptylethyl or cyclooctyl-methyl,
  (d) endoalkylene-cyclohexyl, endoalkylene-cyclohexenyl, endoalkylene-cyclohexylmethyl or endoalkylene-cyclohexenylmethyl with 1–2 endoalkylene carbon atoms,
  (e) lower alkyl-cyclohexyl,
  (f) cycloalkyl of 5 to 8 carbon atoms, or
  (g) cyclohexenyl of cyclohexenyl-methyl;
or a physiologically tolerable salt thereof.
2. N-[4-(β-phthalimidoethyl) - benzenesulfonyl] - N'-cyclohexyl-urea and physiologically tolerable salts thereof.
3. N-[4-(β-phthalimido - α - methyl - ethyl) - benzenesulfonyl]-N'-n-butyl-urea and physiologically tolerable salts thereof.
4. N-[4-(β-phthalimido - α - methyl - ethyl) - benzenesulfonyl]-N'-(4-methyl-cyclohexyl-urea and physiologically tolerable salts thereof.

5. N-[4-(β-4' - chloro - phthalimidoethyl) - benzenesulfonyl]-N'cyclohexyl-urea and physiologically tolerable salts thereof.

6. N-[4-(β - hexahydro - phthalimidoethyl) - benzenesulfonyl]-N'-(4-methyl-cyclohexyl)-urea and physiologically tollerable salts thereof.

7. N-[4-(β-Δ⁴-tetrahydro - phthalimidoethyl - benzenesulfonyl]-N'-(4-methyl-cyclohexyl-urea and physiologically tolerable salts thereof.

8. N-[4-(β-4' - chloro - phthalimidoethyl) - benzenesulfonyl]-N'-(4 - methyl - cyclohexyl) - urea and physiologically tolerable salts thereof.

9. N-[4-γ-naphthalimido - propyl) - benzenesulfonyl]-N'-(4-methyl-cyclohexyl)-urea and physiologically tolerable salts thereof.

10. N-[4-(β-naphthalimido - ethyl) - benzenesulfonyl]-N'-cyclohexyl-urea and physiologically tolerable salts thereof.

11. N-[4-β-naphthalimido - ethyl) - benzenesulfonyl]-N'-isobutyl-urea and physiologically tolerable salts thereof.

12. N-[4-(β<3,6 - methylene-Δ⁴ - tetrahydro - phthalimido>ethyl)-benzenesulfonyl]-N'-cyclohexyl - urea and physiologically tolerable salts thereof.

13. N-[4-(β-3,6-methylene - hexahydro - phthalimidoethyl)-benzenesulfonyl]-N'-cyclohexyl - urea and physiologically tolerable salts thereof.

14. N-[4-(β-<3,6-methylene-Δ⁴ - tetrahydro - phthalimido>-ethyl)-benzenesulfonyl]-N' - n - hexyl - urea and physiologically tolerable salts thereof.

References Cited

UNITED STATES PATENTS

| 2,096,295 | 10/1937 | Eckert et al. | 260—281 |
| 3,119,843 | 1/1964 | Jucker | 260—287 X |
| 3,184,464 | 5/1965 | Haack et al. | 260—287 |

FOREIGN PATENTS 6,514,059  5/1966  Netherlands.

ALEX MAZEL, *Primary Examiner.*

D. G. DAUS, *Assistant Examiner.*

U.S. Cl. X.R.

260—326, 247.1, 242.2, 543, 552, 553, 518, 514, 470; 424—258, 274